United States Patent
Wang

(10) Patent No.: US 10,073,312 B2
(45) Date of Patent: Sep. 11, 2018

(54) STRUCTURE FOR LCD PANEL

(71) Applicant: Wuhan China Star Optoelectronics Technology Co., Ltd., Wuhan (CN)

(72) Inventor: Cong Wang, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 258 days.

(21) Appl. No.: 14/912,603

(22) PCT Filed: Jan. 29, 2016

(86) PCT No.: PCT/CN2016/072650
§ 371 (c)(1),
(2) Date: Feb. 18, 2016

(87) PCT Pub. No.: WO2017/096706
PCT Pub. Date: Jun. 15, 2017

(65) Prior Publication Data
US 2017/0255073 A1    Sep. 7, 2017

(30) Foreign Application Priority Data
Dec. 11, 2015   (CN) .......................... 2015 1 0923859

(51) Int. Cl.
*G02F 1/1343* (2006.01)
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/13624* (2013.01); *G02F 2202/104* (2013.01)

(58) Field of Classification Search
None
See application file for complete search history.

(56) References Cited

U.S. PATENT DOCUMENTS

| | | | | |
|---|---|---|---|---|
| 7,683,977 B2 * | 3/2010 | Nagata | ............... | G02F 1/1368 |
| | | | | 257/72 |
| 2004/0263743 A1 * | 12/2004 | Kim | ............... | G02F 1/134363 |
| | | | | 349/139 |
| 2004/0263744 A1 * | 12/2004 | Lee | ............... | G02F 1/1368 |
| | | | | 349/139 |

(Continued)

FOREIGN PATENT DOCUMENTS

| CN | 1637561 A | 7/2005 |
|---|---|---|
| CN | 1892778 A | 1/2007 |
| CN | 102081245 A | 6/2011 |

*Primary Examiner* — Edward Glick
*Assistant Examiner* — David Chung
(74) *Attorney, Agent, or Firm* — Leong C. Lei

(57) ABSTRACT

The invention provides a structure for LCD panel, by disposing a first and a second common voltage buses (Com1, Com2) on the two sides of the active area (AA) of the LCD panel, and the first common voltage bus (Com1) carrying a first common voltage Vcom1 different from a second common voltage Vcom2 carried on the second common voltage bus (Com2), in combination with different sub-pixel routings to achieve the inversion or dot inversion driving mode, solve the image sticking, crosstalk and flicker problems and improve display quality of the LCD panel.

4 Claims, 6 Drawing Sheets

(56) References Cited

U.S. PATENT DOCUMENTS

| | | | |
|---|---|---|---|
| 2005/0139837 A1* | 6/2005 | Lee | G02F 1/134363 257/72 |
| 2007/0165171 A1* | 7/2007 | Lee | G02F 1/134363 349/139 |
| 2009/0185093 A1* | 7/2009 | Gao | G02F 1/1345 349/42 |
| 2011/0128272 A1* | 6/2011 | Chen | G09G 3/3614 345/211 |

* cited by examiner

STRUCTURE FOR LCD PANEL

BACKGROUND OF THE INVENTION

1. Field of the Invention

The present invention relates to the field of display, and in particular to a structure for LCD display panel.

2. The Related Arts

The liquid crystal display (LCD) has the advantages of thin, energy-saving, radiation-free, and is widely applied to, such as, liquid crystal (LC) TV, mobile phone, personal digital assistant (PDA), digital camera, computer monitor or notebook computer monitor, and dominates the tablet display market.

In the known LCDs, the majority is of the backlight type, comprising LCD panel and the backlight module. . The operation theory behind the LCD panel is to fill the LC molecules into between a thin film transistor (TFT) array substrate and a color filter (CF) substrate, and apply a driving voltage between the two substrates to control the rotation of the LC molecules to refract the light from the backlight module.

The LCD panel comprises various pixel arrangements of array forms, with each pixel comprising a plurality of sub-pixels. Each sub-pixel is connected to a TFT, and the gate of the TFT is connected to a horizontal scan line, the drain is connected to a data line in the vertical direction and the source is connected to a pixel electrode. When a sufficient voltage is applied to the horizontal scan line, the TFT connected to the scan line will turn on so that the signal voltage on the data line can be written into the sub-pixels to control the transmittance of the LC to achieve displaying.

The design of known LCD panel usually uses parity inversion manner on the pixel array to improve the panel display effect and performance. To reduce the integrated circuit (IC) driving power consumption, the frame inversion mode, or the column inversion mode is realized. However the frame inversion or column inversion mode will cause the image sticking (IS), crosstalk and flicker problem, especially for the low temperature polysilicon (LTPS) based LCD panel, the frame inversion or column inversion often causes crosstalk and severely affects the display quality.

Refer to FIG. 1. FIG. 1 shows a schematic view of the structure of a known LCD panel, comprising a plurality of parallel scan lines in the horizontal direction (such as, G(1), G(2), G(3), G(4), and so on), a plurality of parallel data lines in the vertical direction (such as, D(1), D(2), D(3), D(4), and so on), a plurality of sub-pixels P arranged in an array form, a plurality of common voltage branch lines (such as, L(1), L(2), L(3), L(4), and so on) disposed horizontally corresponding to sub-pixels of each column, and a common voltage bus Com disposed vertically, with each common voltage branch connected directly to the common voltage Com, so that all the pixels in the LCD panel share a constant common voltage Vcom. The driving of the scan line is to scan line-by-line on both sides. Because all the pixels in the LCD panel share a constant common voltage Vcom, when the TFT of a sub-pixel P is turned on, the driving voltage to drive the liquid crystal to rotate is $\Delta V = V_{PE} - Vcom$, wherein $V_{PE}$ is the pixel voltage of a sub-pixel, Vcom is the common voltage. For any sub-pixel, if $\Delta V>0$, the driving voltage for the sub-pixel has positive parity; otherwise, if $\Delta V<0$, the driving voltage for the sub-pixel has negative parity. For example, when the entire IC output a voltage in a frame to make $\Delta V>0$, the parity display effect of the LCD panel is shown as in FIG. 2. In the entire frame, the driving voltages of all the sub-pixels show positive parity, until the next frame, when the entire IC output a voltage in a frame to make $\Delta V<0$, the entire frame of the parity inversion, and the driving voltages of all the sub-pixels show negative parity (as shown in FIG. 3), which realizes the frame inversion. However, the frame inversion leads to severe image sticking, crosstalk and flicker problems, and shows poor display quality.

SUMMARY OF THE INVENTION

The object of the present invention is to provide a structure for LCD panel; able to realize inversion or dot inversion driving mode to solve the image sticking, crosstalk and flicker problems and improve LCD panel display quality.

To achieve the above object, the present invention provides a structure for LCD panel. Optionally, the structure for LCD panel comprises, in an active area of the LCD panel, a plurality of parallel horizontal gate scan lines, a plurality of parallel vertical data lines, a plurality of sub-pixels arranged in an array form, a plurality of common voltage branch lines disposed horizontally corresponding to sub-pixels of each column, and a first common voltage bus and a second common voltage bus, disposed vertically respectively at two sides of the active area, the first common voltage bus transmitting a first common voltage Vcom1 different from a common voltage Vcom2 transmitted by the second common voltage bus; each sub-pixel comprising: a thin film transistor (TFT), and a storage capacitor and a liquid crystal (LC) capacitor, connected in parallel; for a positive integer s, the sources of the TFTs of the sub-pixels in the s-th column connected to the s-th data line; for a positive integer n, the n-th gate scan line located above the sub-pixels of the n-th column, the n-th common voltage branch located below the sub-pixels of the n-th column; the gates of the TFTs of sub-pixels of the n-th column connected to the n-th scan line; for an odd number i, one end of the storage capacitor and the LC capacitor of any sub-pixel in the i-th column connected to the drain of the corresponding TFT, the other end connected to the corresponding i-th common voltage branch; the corresponding i-th common voltage branch connected through a first switch TFT to the second common voltage bus; the first switch TFT having the gate connected to the corresponding i-th scan line, the source connected to the second common voltage bus, and the drain connected to corresponding i-th common voltage branch; for the (i+1)-th column, one end of the storage capacitor and the LC capacitor of any sub-pixel connected to the drain of the corresponding TFT, the other end connected to the corresponding (i+1)-th common voltage branch; the corresponding (i+1)-th common voltage branch connected through a second switch TFT to the first common voltage bus; the second switch TFT having the gate connected to the corresponding (i+1)-th scan line, the source connected to the first common voltage bus, and the drain connected to corresponding (i+1)-th common voltage branch.

One of the first common voltage Vcom1 transmitted on the first common voltage bus, and the second common voltage Vcom2 transmitted on the second common voltage bus is greater than the pixel voltage, and the other is smaller than the pixel voltage.

In two adjacent frames, the first common voltage Vcom1 transmitted on the first common voltage bus, and the second common voltage Vcom2 transmitted on the second common voltage bus are switched to realize the inversion mode.

The TFTs are low temperature polysilicon (LTPS) TFTs.

Optionally, the structure for LCD panel of the present invention comprises, in an active area of the LCD panel, a plurality of parallel horizontal gate scan lines, a plurality of parallel vertical data lines, a plurality of sub-pixels arranged in an array form, a plurality of common voltage branch lines disposed horizontally corresponding to sub-pixels of each column, and a first common voltage bus and a second common voltage bus, disposed vertically respectively at two sides of the active area, a zeroth scan line disposed horizontally outside of the active area, and a zeroth common voltage branch disposed horizontally outside of the active area, the first common voltage bus transmitting a first common voltage Vcom1 different from a common voltage Vcom2 transmitted by the second common voltage bus; each sub-pixel comprising: a thin film transistor (TFT), and a storage capacitor and a liquid crystal (LC) capacitor, connected in parallel; for a positive integer s, the sources of the TFTs of the sub-pixels in the s-th column connected to the s-th data line; for a positive integer n, the n-th gate scan line located above the sub-pixels of the n-th column, the n-th common voltage branch located below the sub-pixels of the n-th column; the gates of the TFTs of sub-pixels of the n-th column connected to the n-th scan line; for an odd number i, one end of the storage capacitor and the LC capacitor of any sub-pixel in the i-th column connected to the drain of the corresponding TFT, for sub-pixels in the odd-numbered rows of the i-th column, the other end connected to the corresponding i-th common voltage branch, and for sub-pixels in the even-numbered rows of the i-th column, the other end connected to the (i−1)-th common voltage branch; the corresponding i-th common voltage branch connected through a first switch TFT to the first common voltage bus, and the (i−1)-th common voltage branch connected through a second switch TFT to the second common voltage bus; the first switch TFT having the gate connected to the corresponding i-th scan line, the source connected to the second common voltage bus, and the drain connected to corresponding i-th common voltage branch; for the (i+1)-th column, one end of the storage capacitor and the LC capacitor of any sub-pixel connected to the drain of the corresponding TFT, for sub-pixels in the odd-numbered rows of the (i+1)-th column, the other end connected to the corresponding (i+1)-th common voltage branch, for sub-pixels in the even-numbered rows of the (i+1)-th column, the other end connected to the i-th common voltage branch; the corresponding (i+1)-th common voltage branch connected through a second switch TFT to the second common voltage bus; the first switch TFT having the gate connected to the corresponding odd-numbered scan line, the source connected to the first common voltage bus, and the drain connected to corresponding odd-numbered common voltage branch; the second switch TFT having the gate connected to the corresponding even-numbered scan line or the zeroth scan line, the source connected to the second common voltage bus, and the drain connected to corresponding even-numbered common voltage branch or the zeroth common voltage branch.

One of the first common voltage Vcom1 transmitted on the first common voltage bus, and the second common voltage Vcom2 transmitted on the second common voltage bus is greater than the pixel voltage, and the other is smaller than the pixel voltage.

In two adjacent frames, the first common voltage Vcom1 transmitted on the first common voltage bus, and the second common voltage Vcom2 transmitted on the second common voltage bus are switched to realize the inversion mode.

The TFTs are low temperature polysilicon (LTPS) TFTs.

Optionally, the structure for LCD panel comprises, in an active area of the LCD panel, a plurality of parallel horizontal gate scan lines, a plurality of parallel vertical data lines, a plurality of sub-pixels arranged in an array form, a plurality of common voltage branch lines disposed horizontally corresponding to sub-pixels of each column, and a first common voltage bus and a second common voltage bus, disposed vertically respectively at two sides of the active area, the first common voltage bus transmitting a first common voltage Vcom1 different from a common voltage Vcom2 transmitted by the second common voltage bus; each sub-pixel comprising: a thin film transistor (TFT), and a storage capacitor and a liquid crystal (LC) capacitor, connected in parallel; for a positive integer s, the sources of the TFTs of the sub-pixels in the s-th column connected to the s-th data line; for a positive integer n, the n-th gate scan line located above the sub-pixels of the n-th column, the n-th common voltage branch located below the sub-pixels of the n-th column; the gates of the TFTs of sub-pixels of the n-th column connected to the n-th scan line; for an odd number i, one end of the storage capacitor and the LC capacitor of any sub-pixel in the i-th column connected to the drain of the corresponding TFT, the other end connected to the corresponding i-th common voltage branch; the corresponding i-th common voltage branch connected through a first switch TFT to the second common voltage bus; the first switch TFT having the gate connected to the corresponding i-th scan line, the source connected to the second common voltage bus, and the drain connected to corresponding i-th common voltage branch; for the (i+1)-th column, one end of the storage capacitor and the LC capacitor of any sub-pixel connected to the drain of the corresponding TFT, the other end connected to the corresponding (i+1)-th common voltage branch; the corresponding (i+1)-th common voltage branch connected through a second switch TFT to the first common voltage bus; the second switch TFT having the gate connected to the corresponding (i+1)-th scan line, the source connected to the first common voltage bus, and the drain connected to corresponding (i+1)-th common voltage branch; wherein one of the first common voltage Vcom1 transmitted on the first common voltage bus, and the second common voltage Vcom2 transmitted on the second common voltage bus is greater than the pixel voltage, and the other is smaller than the pixel voltage; wherein in two adjacent frames, the first common voltage Vcom1 transmitted on the first common voltage bus, and the second common voltage Vcom2 transmitted on the second common voltage bus are switched to realize the inversion mode; wherein the TFTs are low temperature polysilicon (LTPS) TFTs.

Compared to the known techniques, the present invention provides the following advantages: the present invention provides a structure for LCD panel, by disposing a first and a second common voltage buses on the two sides of the active area of the LCD panel, and the first common voltage bus carrying a first common voltage Vcom1 different from a second common voltage Vcom2 carried on the second common voltage bus, in combination with different sub-pixel routings to achieve the inversion or dot inversion driving mode, solve the image sticking, crosstalk and flicker problems and improve display quality of the LCD panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

Figures 2, 3:
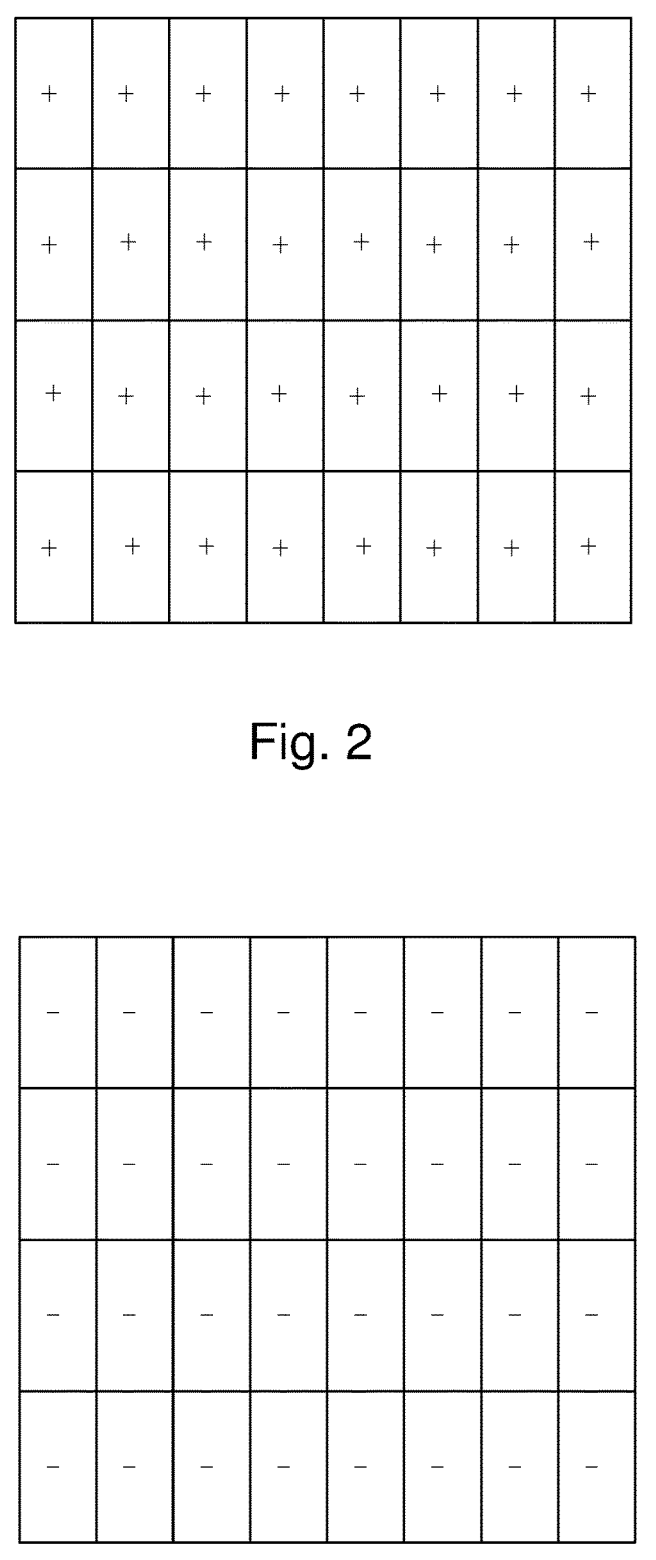

FIG. 2 and FIG. 3 are schematic views respectively showing the parity of two adjacent frames displayed by the LCD panel of FIG. 1;

FIG. 5 and FIG. 6 are schematic views respectively showing the parity of two adjacent frames displayed by the LCD panel of FIG. 4;

FIG. 8 and FIG. 9 are schematic views respectively showing the parity of two adjacent frames displayed by the LCD panel of FIG. 7.

DETAILED DESCRIPTION OF THE PREFERRED EMBODIMENTS

To further explain the technical means and effect of the present invention, the following refers to embodiments and drawings for detailed description.

Figure 1:
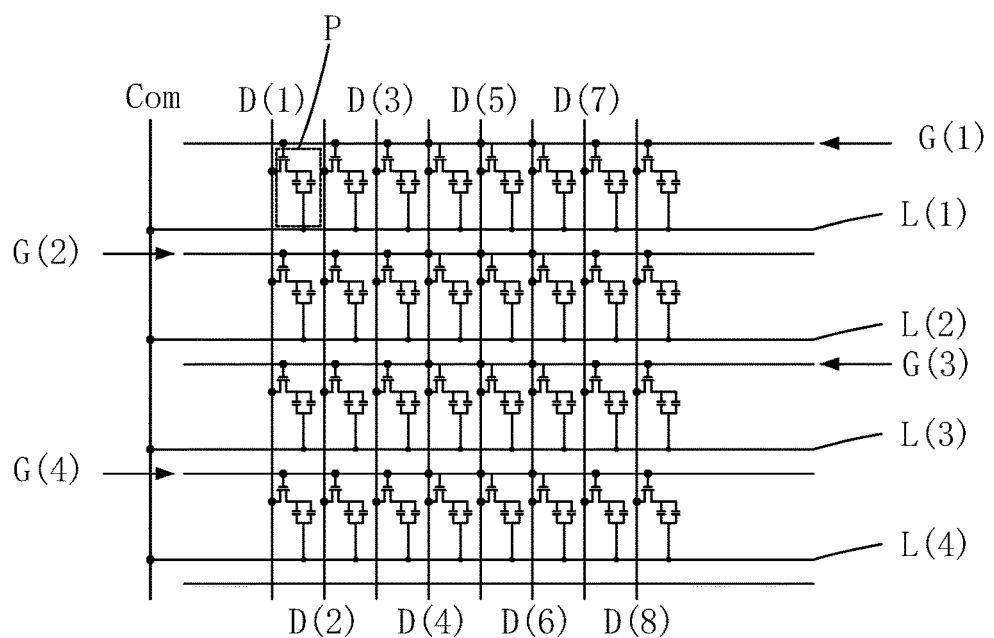
FIG. 1 is a schematic view showing the structure for a known LCD panel.
Figure 4:
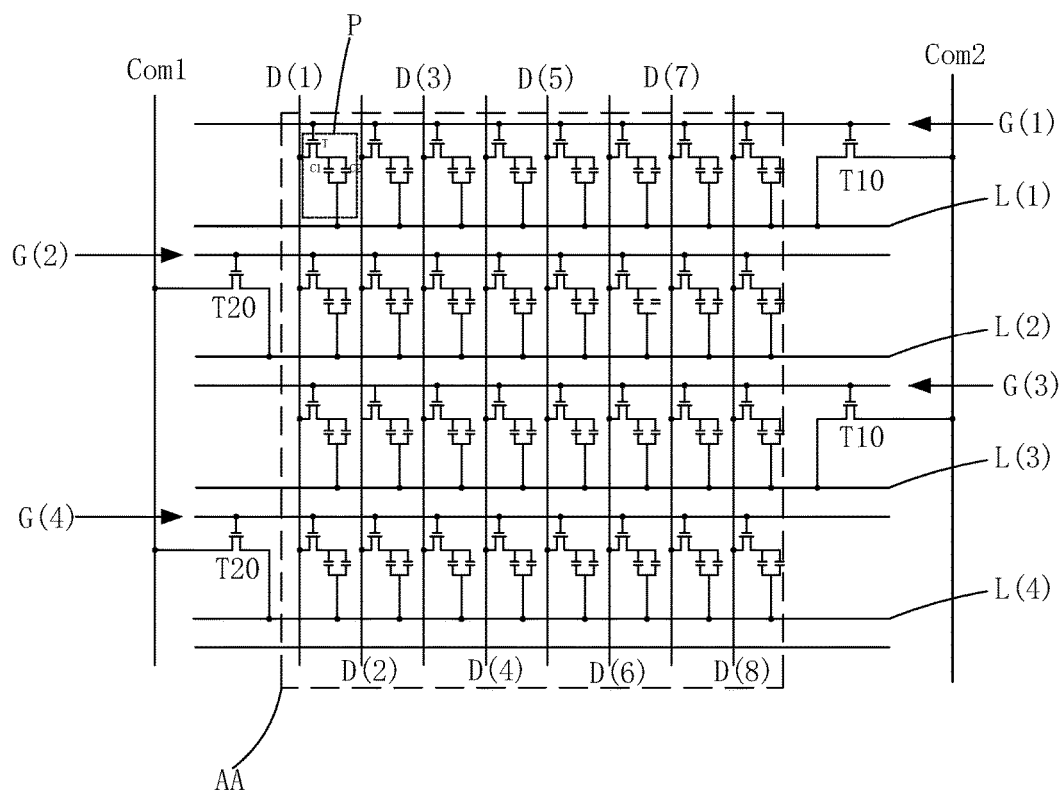
FIG. 4 is a schematic view showing the first embodiment of the structure for LCD panel provided by an embodiment of the present invention.
Figures 5, 6:
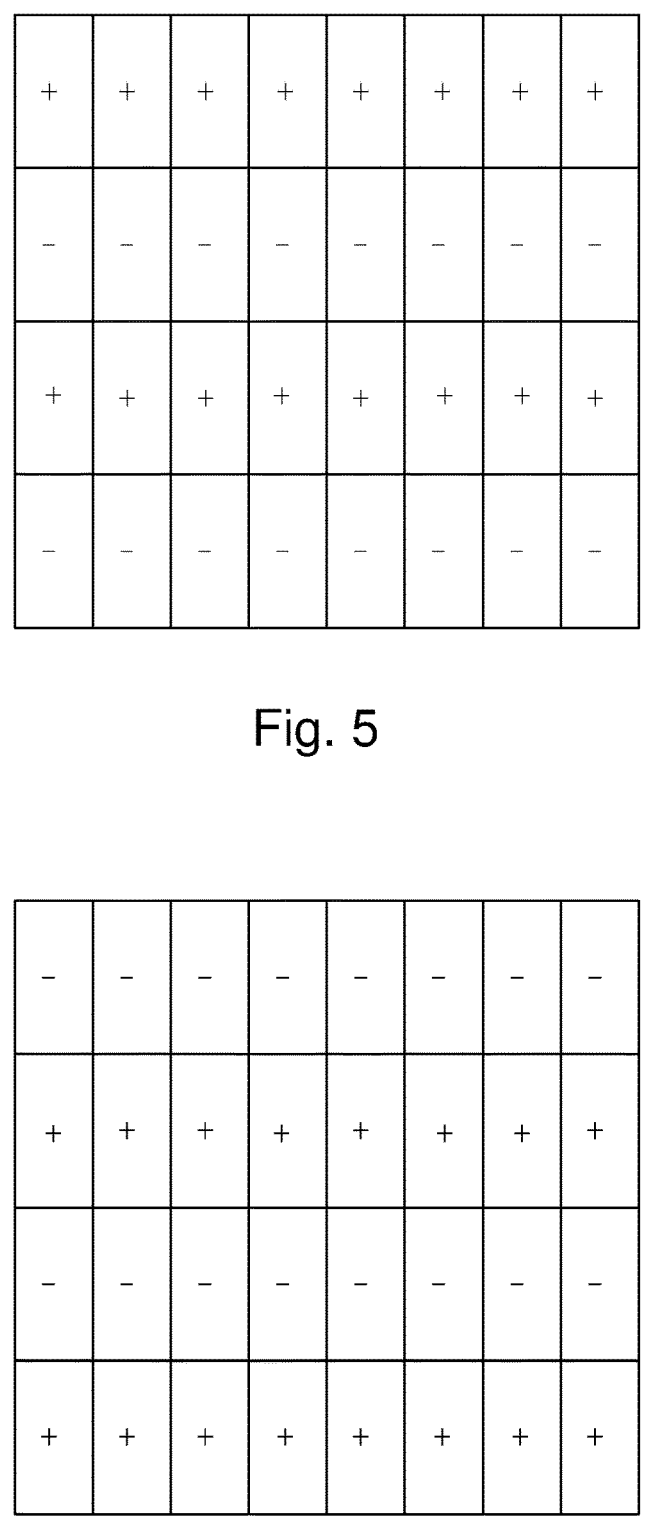

The present invention provides a structure for LCD panel. Refer to FIGS. 4, 5, 6 for the first embodiment of the present invention. The first embodiment of the present invention comprises: in an active area AA of the LCD panel, a plurality of parallel horizontal gate scan lines, a plurality of parallel vertical data lines, a plurality of sub-pixels P arranged in an array form, a plurality of common voltage branch lines disposed horizontally corresponding to sub-pixels P of each column, and a first common voltage bus Com1 and a second common voltage bus Com2, disposed vertically respectively at two sides of the active area AA.

As shown in FIG. 4, each sub-pixel P comprises a TFT T, a storage capacitor C1 and a liquid crystal (LC) capacitor C2, connected in parallel.

For a positive integer s, the sources of the TFTs of the sub-pixels in the s-th column are connected to the s-th data line D(s). For example, the sources of all the TFTs T of the sub-pixels P in the first row are connected to the first data line D(1); the sources of all the TFTs T of the sub-pixels P in the second row are connected to the second data line D(2); and so on.

For a positive integer n, the n-th gate scan line G(n) is located above the sub-pixels P of the n-th column, the n-th common voltage branch L(n) is located below the sub-pixels P of the n-th column; the gates of the TFTs T of sub-pixels P of the n-th column are connected to the n-th scan line G(n). For example, the first scan line G(1) is located above the sub-pixels P of the first column, the first common voltage branch L(1) is located below the sub-pixels P of the first column; the gates of the TFTs T of sub-pixels P of the first column are connected to the first scan line G(1); the second scan line G(2) is located above the sub-pixels P of the second column, the second common voltage branch L(2) is located below the sub-pixels P of the second column; the gates of the TFTs T of sub-pixels P of the second column are connected to the second scan line G(2); and so on.

For an odd number i, one end of the storage capacitor C1 and the LC capacitor C2 of any sub-pixel P in the i-th column (i.e., odd-numbered column) is connected to the drain of the corresponding TFT T, and the other end is connected to the corresponding i-th common voltage branch L(i); the corresponding i-th common voltage branch L(i) is connected through a first switch TFT T10 to the second common voltage bus Com2; the first switch TFT T10 has the gate connected to the corresponding i-th scan line G(i), the source connected to the second common voltage bus Com2, and the drain connected to corresponding i-th common voltage branch L(i).

For the (i+1)-th column (i.e., even-numbered column), one end of the storage capacitor C1 and the LC capacitor C2 of any sub-pixel is connected to the drain of the corresponding TFT T, the other end is connected to the corresponding (i+1)-th common voltage branch L(i+1); the corresponding (i+1)-th common voltage branch L(i+1) is connected through a second switch TFT T20 to the first common voltage bus Com1; the second switch TFT T20 has the gate connected to the corresponding (i+1)-th scan line G(i+1), the source connected to the first common voltage bus Com1, and the drain connected to corresponding (i+1)-th common voltage branch L(i+1).

Specifically, the TFTs are LTPS TFTs.

It should be noted that the first common voltage bus Com1 transmitting a first common voltage Vcom1 different from a common voltage Vcom2 transmitted by the second common voltage bus Com2. Moreover, one of the first common voltage Vcom1 transmitted on the first common voltage bus Com1, and the second common voltage Vcom2 transmitted on the second common voltage bus Com2 is greater than the pixel voltage, and the other is smaller than the pixel voltage. Also, in two adjacent frames, the first common voltage Vcom1 transmitted on the first common voltage bus Com1, and the second common voltage Vcom2 transmitted on the second common voltage bus Com2 are switched to realize the inversion mode.

Refer to FIG. 4 and FIG. 5, in the first frame of the two adjacent frames: when the i-th scan line provides a scan signal to the pixels of the corresponding the i-th column (i.e., the odd-numbered column), the TFTs T of all the sub-pixels in the i-th column are all turned on to conduct the i-th common voltage branch L(i) and the second common voltage bus Com2 so that the driving voltage $\Delta V$ of the sub-pixels in i-th column is the difference between the pixel voltage $V_{PE}$ and the second common voltage Vcom2 transmitted on the second common voltage bus Com2, i.e., $\Delta V = V_{PE} - Com2$.

When the (i+1)-th scan line provides a scan signal to the pixels of the corresponding the (i+1)-th column (i.e., the even-numbered column), the TFTs T of all the sub-pixels in the i-th column are all turned off, and the difference between the pixel voltage $V_{PE}$ and the second common voltage Vcom2 transmitted on the second common voltage bus Com2, remains unchanged. the TFTs T of all the sub-pixels in the (i+1)-th column are all turned on, the second switch TFTs T20 disposed correspondingly to the sub-pixels in the (i+1)-th column are turned on to conduct the (i+1)-th common voltage branch L(i+1) and the first common voltage bus Com1 so that the driving voltage $\Delta V$ of the sub-pixels in (i+1)-th column is the difference between the pixel voltage $V_{PE}$ and the first common voltage Vcom1 transmitted on the first common voltage bus Com1, i.e., $\Delta V = V_{PE} - Com1$.

For example, when the pixel voltage $V_{PE}$ outputted by all the data lines is +5V, Vcom2 is 0V, and Vcom1 is +10V, then the parity of the sub-pixels in the i-th column (i.e., odd-number column) is +5V, and the parity of the sub-pixels in the (i+1)-th column (i.e., even-number column) is −5V.

Refer to FIG. 4 and FIG. 6, in the second frame of the two adjacent frames: because the values for the first common voltage Vcom1 transmitted by the first common voltage bus Com1 and the second common voltage Vcom2 transmitted by the second common bus Com2 are switched, the parity of the sub-pixels in the i-th column (i.e., odd-number column) is −5V, and the parity of the sub-pixels in the (i+1)-th column (i.e., even-number column) is +5V.

The two adjacent frames realize the inversion mode to solve the image sticking, crosstalk and flicker problems and improve the display quality of the LCD panel.

Figure 7:
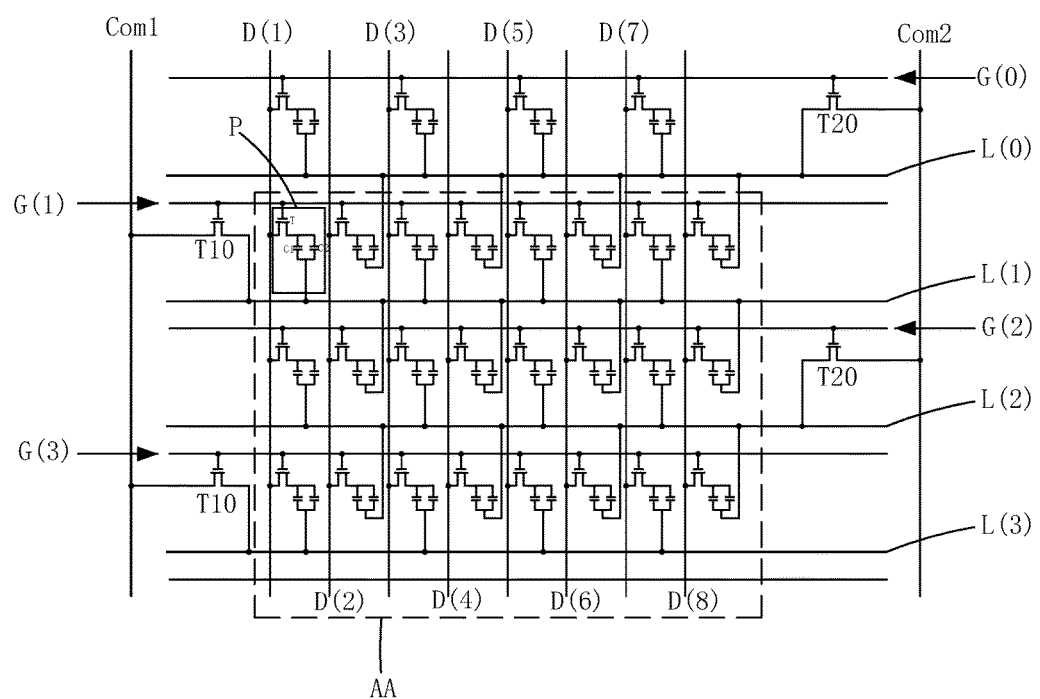
FIG. 7 is a schematic view showing the second embodiment of the structure for LCD panel provided by an embodiment of the present invention.
Figures 8, 9:
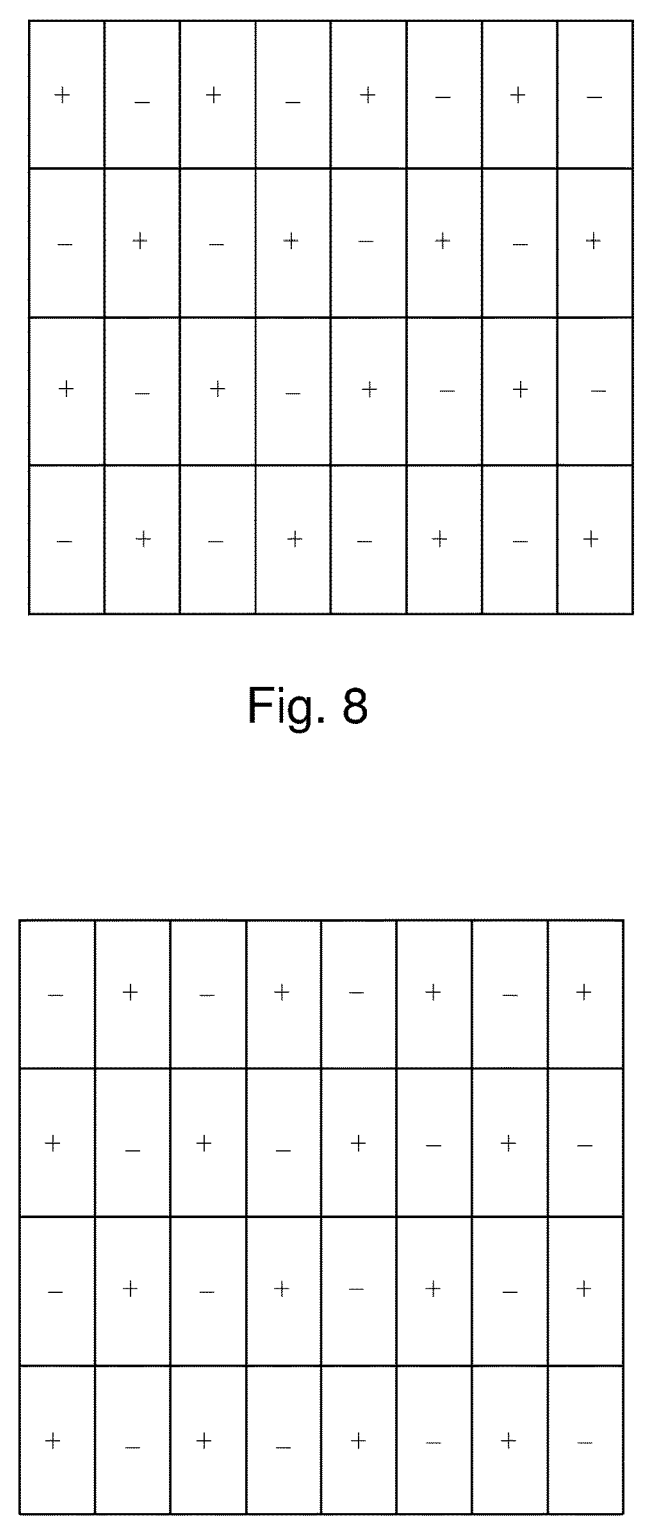

Refer to FIGS. 7, 8, 9 for the second embodiment of the present invention, which comprises: in an active area AA of the LCD panel, a plurality of parallel horizontal gate scan lines, a plurality of parallel vertical data lines, a plurality of sub-pixels P arranged in an array form, a plurality of common voltage branch lines disposed horizontally corresponding to sub-pixels P of each column, and a first common voltage bus Com1 and a second common voltage bus Com2, disposed vertically respectively at two sides of the active area AA, a zeroth scan line G(0) disposed horizontally outside of the active area AA, and a zeroth common voltage branch L(0) disposed horizontally outside of the active area AA.

As shown in FIG. 7, each sub-pixel P comprises a TFT T, a storage capacitor C1 and a liquid crystal (LC) capacitor C2, connected in parallel.

For a positive integer s, the sources of the TFTs of the sub-pixels in the s-th column are connected to the s-th data line D(s). For example, the sources of all the TFTs T of the sub-pixels P in the first row are connected to the first data line D(1); the sources of all the TFTs T of the sub-pixels P in the second row are connected to the second data line D(2); and so on.

For a positive integer n, the n-th gate scan line G(n) is located above the sub-pixels P of the n-th column, the n-th common voltage branch L(n) is located below the sub-pixels P of the n-th column; the gates of the TFTs T of sub-pixels P of the n-th column are connected to the n-th scan line G(n). For example, the first scan line G(1) is located above the sub-pixels P of the first column, the first common voltage branch L(1) is located below the sub-pixels P of the first column; the gates of the TFTs T of sub-pixels P of the first column are connected to the first scan line G(1); the second scan line G(2) is located above the sub-pixels P of the second column, the second common voltage branch L(2) is located below the sub-pixels P of the second column; the gates of the TFTs T of sub-pixels P of the second column are connected to the second scan line G(2); and so on.

For an odd number i, one end of the storage capacitor C1 and the LC capacitor C2 of any sub-pixel P in the i-th column (i.e., odd-numbered column) is connected to the drain of the corresponding TFT T. For sub-pixels in the odd-numbered rows of the i-th column, the other end is connected to the corresponding i-th common voltage branch L(i), and for sub-pixels in the even-numbered rows of the i-th column, the other end is connected to the (i−1)-th common voltage branch L(i−1). The corresponding i-th common voltage branch L(i) is connected through a first switch TFT T10 to the first common voltage bus Com1; and the (i−1)-th common voltage branch L(i−1) is connected through a second switch TFT T20 to the second common voltage bus Com2.

For example, one end of the storage capacitor C1 and the LC capacitor C2 of any sub-pixel P in the first column is connected to the drain of the corresponding TFT T. For sub-pixels in the odd-numbered rows of the first column, the other end of the storage capacitor C1 and the LC capacitor C2 is connected to the corresponding first common voltage branch L(1), and for sub-pixels in the even-numbered rows of the first column, the other end of the storage capacitor C1 and the LC capacitor C2 is connected to the zeroth common voltage branch L(0). The corresponding first common voltage branch L(1) is connected through a first switch TFT T10 to the first common voltage bus Com1; and the zeroth common voltage branch L(0) is connected through a second switch TFT T20 to the second common voltage bus Com2. Similarly, one end of the storage capacitor C1 and the LC capacitor C2 of any sub-pixel P in the third column is connected to the drain of the corresponding TFT T. For sub-pixels in the odd-numbered rows of the third column, the other end of the storage capacitor C1 and the LC capacitor C2 is connected to the corresponding third common voltage branch L(3), and for sub-pixels in the even-numbered rows of the third column, the other end of the storage capacitor C1 and the LC capacitor C2 is connected to the second common voltage branch L(2). The corresponding third common voltage branch L(3) is connected through a first switch TFT T10 to the first common voltage bus Com1; and the second common voltage branch L(2) is connected through a second switch TFT T20 to the second common voltage bus Com2.

For the (i+1)-th column (i.e., even-numbered column), one end of the storage capacitor C1 and the LC capacitor C2 of any sub-pixel is connected to the drain of the corresponding TFT T; for sub-pixels in the odd-numbered rows of the (i+1)-th column, the other end of the storage capacitor C1 and the LC capacitor C2 is connected to the corresponding (i+1)-th common voltage branch L(i+1), for sub-pixels in the even-numbered rows of the (i+1)-th column, the other end of the storage capacitor C1 and the LC capacitor C2 is connected to the i-th common voltage branch L(i); the corresponding (i+1)-th common voltage branch L(i+1) is connected through a second switch TFT T20 to the second common voltage bus Com2.

For example, one end of the storage capacitor C1 and the LC capacitor C2 of any sub-pixel P in the second column is connected to the drain of the corresponding TFT T. For sub-pixels in the odd-numbered rows of the second column, the other end of the storage capacitor C1 and the LC capacitor C2 is connected to the corresponding first common voltage branch L(2), and for sub-pixels in the even-numbered rows of the second column, the other end of the storage capacitor C1 and the LC capacitor C2 is connected to the first common voltage branch L(1). The corresponding second common voltage branch L(2) is connected through a second switch TFT T20 to the second common voltage bus Com2.

The first switch TFT T10 has the gate connected to the corresponding i-th scan line G(i), the source connected to the first common voltage bus Com1, and the drain connected to corresponding i-th common voltage branch L(i). The second switch TFT T20 the gate connected to the corresponding even-numbered scan line G(i+1) or the zeroth scan line G(0), the source connected to the second common voltage bus Com2, and the drain connected to corresponding even-numbered common voltage branch L(i+1) or the zeroth common voltage branch L(0).

Specifically, the TFTs are LTPS TFTs.

It should be noted that the first common voltage bus Com1 transmitting a first common voltage Vcom1 different from a common voltage Vcom2 transmitted by the second common voltage bus Com2. Moreover, one of the first common voltage Vcom1 transmitted on the first common voltage bus Com1, and the second common voltage Vcom2 transmitted on the second common voltage bus Com2 is greater than the pixel voltage, and the other is smaller than the pixel voltage. Also, in two adjacent frames, the first common voltage Vcom1 transmitted on the first common voltage bus Com1, and the second common voltage Vcom2 transmitted on the second common voltage bus Com2 are switched to realize the inversion mode.

Refer to FIG. 7 and FIG. 8, in the first frame of the two adjacent frames: when the zeroth scan line G(0) provides a scan signal, the second switch TFTs T20 correspond to the zeroth common voltage branch are all turned on to conduct the zeroth common voltage branch L(0) and the second common voltage bus Com2 so that the common voltage of the sub-pixels in first column is the second common voltage Vcom2 transmitted on the second common voltage bus Com2.

Then, the first scan line G(1) provides a scan signal to the pixels of the corresponding the first column, the TFTs T of all the sub-pixels in the first column are all turned on, the first switch TFT T10 disposed correspondingly to the first common voltage branch L(1) is turned on to conduct the first common voltage branch L(1) and the first common voltage bus Com1 so that the common voltage of the sub-pixels in the first column odd-numbered row is the first common voltage Vcom1 transmitted on the first common voltage bus Com1, and the common voltage of the sub-pixels in the second column even-numbered row is the first common voltage Vcom1 transmitted on the first common voltage bus Com1. Assume that the pixel voltage $V_{PE}$ outputted by all the data lines is +5V, Vcom2 is +10V, and Vcom1 is 0V, then the driving voltage $\Delta V$ of the sub-pixels in the first column odd-numbered rows is the difference between the pixel voltage $V_{PE}$ and the first common voltage Vcom1 transmitted on the first common voltage bus Com1, i.e., $\Delta V = V_{PE} - Com1 = +5V$. The driving voltage $\Delta V$ of the sub-pixels in the first column even-numbered rows is the difference between the pixel voltage $V_{PE}$ and the second common voltage Vcom2 transmitted on the second common voltage bus Com2, i.e., $\Delta V = V_{PE} - Com2 = -5V$. In other words, the parity of the sub-pixels in the first column odd-number rows is +5V, and the parity of the sub-pixels in the first column even-number rows is −5V.

Then, the second scan line G(2) provides a scan signal. The TFTs T of all the sub-pixels in the second column are all turned on, the second switch TFT T20 disposed correspondingly to the second common voltage branch L(2) is turned on to conduct the second common voltage branch L(2) and the second common voltage bus Com2 so that the common voltage of the sub-pixels in the second column odd-numbered row is the second common voltage Vcom2 transmitted on the second common voltage bus Com2, and the common voltage of the sub-pixels in the third column even-numbered row is the second common voltage Vcom2 transmitted on the second common voltage bus Com2. Assume that the pixel voltage $V_{PE}$ outputted by all the data lines is +5V, Vcom2 is +10V, and Vcom1 is 0V, then the driving voltage $\Delta V$ of the sub-pixels in the second column odd-numbered rows is the difference between the pixel voltage $V_{PE}$ and the second common voltage Vcom2 transmitted on the second common voltage bus Com2, i.e., $\Delta V = V_{PE} - Com2 = -5V$. The driving voltage $\Delta V$ of the sub-pixels in the second column even-numbered rows is the difference between the pixel voltage $V_{PE}$ and the first common voltage Vcom1 transmitted on the first common voltage bus Com1, i.e., $\Delta V = V_{PE} - Com1 = +5V$. In other words, the parity of the sub-pixels in the second column odd-number rows is −5V, and the parity of the sub-pixels in the second column even-number rows is +5V.

Accordingly, the second embodiment allows the LCD panel to have the parity of the sub-pixels in the odd-numbered column odd-number rows in the previous frame is +5V, and the parity of the sub-pixels in the odd-numbered column even-number rows is −5V; while the parity of the sub-pixels in the even column odd-number rows is −5V, and the parity of the sub-pixels in the even column even-number rows is +5V.

Refer to FIG. 7 and FIG. 9, in the second frame of the two adjacent frames: because the values for the first common voltage Vcom1 transmitted by the first common voltage bus Com1 and the second common voltage Vcom2 transmitted by the second common bus Com2 are switched, the parity of the sub-pixels in the odd-numbered column odd-number rows in the previous frame is −5V, and the parity of the sub-pixels in the odd-numbered column even-number rows is +5V; while the parity of the sub-pixels in the even column odd-number rows is +5V, and the parity of the sub-pixels in the even column even-number rows is −5V.

The two adjacent frames realize the inversion mode to solve the image sticking, crosstalk and flicker problems and improve the display quality of the LCD panel.

In summary, the present invention provides a structure for LCD panel, by disposing a first and a second common voltage buses on the two sides of the active area of the LCD panel, and the first common voltage bus carrying a first common voltage Vcom1 different from a second common voltage Vcom2 carried on the second common voltage bus, in combination with different sub-pixel routings to achieve the inversion or dot inversion driving mode, solve the image sticking, crosstalk and flicker problems and improve display quality of the LCD panel.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A structure for liquid crystal display (LCD) panel, which comprises: in an active area of the LCD panel, a plurality of parallel horizontal gate scan lines, a plurality of parallel vertical data lines, a plurality of sub-pixels arranged in an array form, a plurality of common voltage branch lines disposed horizontally corresponding to sub-pixels of each column, and a first common voltage bus and a second common voltage bus, disposed vertically respectively at two sides of the active area, a zeroth scan line disposed horizontally outside of the active area, and a zeroth common voltage branch disposed horizontally outside of the active area, the first common voltage bus transmitting a first common voltage Vcom1 different from a common voltage Vcom2 transmitted by the second common voltage bus;

each sub-pixel comprising: a thin film transistor (TFT), and a storage capacitor and a liquid crystal (LC) capacitor, connected in parallel;

for a positive integer s, the sources of the TFTs of the sub-pixels in the s-th column connected to the s-th data line;

for a positive integer n, the n-th gate scan line located above the sub-pixels of the n-th column, the n-th common voltage branch located below the sub-pixels of the n-th column; the gates of the TFTs of sub-pixels of the n-th column connected to the n-th scan line;

for an odd number i, one end of the storage capacitor and the LC capacitor of any sub-pixel in the i-th column connected to the drain of the corresponding TFT, for sub-pixels in the odd-numbered rows of the i-th column, the other end connected to the corresponding i-th common voltage branch, and for sub-pixels in the even-numbered rows of the i-th column, the other end connected to the (i−1)-th common voltage branch; the corresponding i-th common voltage branch connected through a first switch TFT to the first common voltage bus, and the (i−1)-th common voltage branch connected through a second switch TFT to the second common voltage bus; the first switch TFT having the gate connected to the corresponding i-th scan line, the source connected to the second common voltage bus, and the drain connected to corresponding i-th common voltage branch;

for the (i+1)-th column, one end of the storage capacitor and the LC capacitor of any sub-pixel connected to the drain of the corresponding TFT, for sub-pixels in the odd-numbered rows of the (i+1)-th column, the other end connected to the corresponding (i+1)-th common voltage branch, for sub-pixels in the even-numbered rows of the (i+1)-th column, the other end connected to the i-th common voltage branch; the corresponding (i+1)-th common voltage branch connected through a second switch TFT to the second common voltage bus; and the first switch TFT having the gate connected to the corresponding odd-numbered scan line, the source connected to the first common voltage bus, and the drain connected to corresponding odd-numbered common voltage branch; the second switch TFT having the gate connected to the corresponding even-numbered scan line or the zeroth scan line, the source connected to the second common voltage bus, and the drain connected to corresponding even-numbered common voltage branch or the zeroth common voltage branch.

2. The structure for LCD panel as claimed in claim 1, wherein one of the first common voltage Vcom1 transmitted on the first common voltage bus, and the second common voltage Vcom2 transmitted on the second common voltage bus is greater than the pixel voltage, and the other is smaller than the pixel voltage.

3. The structure for LCD panel as claimed in claim 2, wherein in two adjacent frames, the first common voltage Vcom1 transmitted on the first common voltage bus, and the second common voltage Vcom2 transmitted on the second common voltage bus are switched to realize the inversion mode.

4. The structure for LCD panel as claimed in claim 1, wherein the TFTs are low temperature polysilicon (LTPS) TFTs.

* * * * *